US011187358B2

(12) United States Patent
Lim et al.

(10) Patent No.: US 11,187,358 B2
(45) Date of Patent: Nov. 30, 2021

(54) UNIVERSAL VACUUM FITTING CLAMP WITH TORQUE CONTROL

(71) Applicant: Applied Seals North America, Inc., Fremont, CA (US)

(72) Inventors: Patrick Lim, San Jose, CA (US); Shuai Zhao, San Bruno, CA (US); Ray Wu, Taipei (TW); Dalia Vernikovsky, Union City, CA (US); Malcolm Rollason, Union City, CA (US)

(73) Assignee: APPLIED SEALS NORTH AMERICA, INC., Fremont, CA (US)

( * ) Notice: Subject to any disclaimer, the term of this patent is extended or adjusted under 35 U.S.C. 154(b) by 40 days.

(21) Appl. No.: 16/656,490

(22) Filed: Oct. 17, 2019

(65) Prior Publication Data

US 2020/0124212 A1 Apr. 23, 2020

Related U.S. Application Data

(60) Provisional application No. 62/747,653, filed on Oct. 18, 2018.

(51) Int. Cl.
*F16L 23/10* (2006.01)
*F16L 23/18* (2006.01)
(Continued)

(52) U.S. Cl.
CPC ............... *F16L 23/10* (2013.01); *F16L 23/18* (2013.01); *F16L 23/003* (2013.01); *F16L 23/036* (2013.01);
(Continued)

(58) Field of Classification Search
CPC ....... F16L 23/10; F16L 23/18; F16L 2201/30; F16L 2201/60
(Continued)

(56) References Cited

U.S. PATENT DOCUMENTS 3,563,571 A * 2/1971 Werra .................... F16L 23/10
285/367
4,049,296 A * 9/1977 Harrison
(Continued)

OTHER PUBLICATIONS

A marketing sheet and technical guide of the Applicant (2 pages): titled as "SMARTSeal PRISM OneKit TM", and showing the publishing date as 2016 (at the bottom of 2nd page), published in US. It was used for promoting Applicant's products including the Seal Assembly, which is commercially known as "PRISM OneKit TM ", to potential customers during the annual microelectronics trade fair "SEMICON West 2016" held in San Francisco, between the dates Jul. 12-14, 2016.
(Continued)

*Primary Examiner* — Zachary T Dragicevich
(74) *Attorney, Agent, or Firm* — Halit N. Yakupoglu

(57) ABSTRACT

A sealing system for establishing real time sealing between two flange members is provided. The sealing system includes a seal assembly disposed between the flange members. The seal assembly includes an o-ring seal component held between an outer seal component and an inner seal component. A clamp body including a first clamp arm and a second clamp arm receive the flange members and the seal assembly positioned between the flange members. A coupling device of the sealing system is used to apply torque to clamp arms to draw them each other resulting biasing the flange member toward each other to establish sealing. Each of the clamp arms includes at least one window opening to expose a portion of outer seal component that includes an indicator configured for displaying an identification feature of the o-ring seal component of the sealing assembly.

23 Claims, 13 Drawing Sheets

(51) Int. Cl.
*F16L 23/00* (2006.01)
*F16L 23/22* (2006.01)
*F16L 23/036* (2006.01)

(52) U.S. Cl.
CPC .......... *F16L 23/22* (2013.01); *F16L 2201/30* (2013.01); *F16L 2201/60* (2013.01)

(58) Field of Classification Search
USPC .......................................... 285/93, 364, 467
See application file for complete search history.

(56) References Cited

U.S. PATENT DOCUMENTS

| | | | | |
|---|---|---|---|---|
| 5,522,625 | A * | 6/1996 | Flick | F16L 23/10 285/367 |
| 5,609,369 | A * | 3/1997 | Wilder | 285/93 |
| 5,653,481 | A * | 8/1997 | Alderman | F16L 23/10 285/367 |
| 10,001,233 | B2 * | 6/2018 | Lee | F16L 23/10 |
| 2001/0022448 | A1 * | 9/2001 | Matsuzawa | F16L 23/10 285/367 |
| 2002/0185869 | A1 * | 12/2002 | Lin | F16L 23/10 285/367 |
| 2006/0197344 | A1 * | 9/2006 | Henry | F16L 23/10 |
| 2006/0202480 | A1 * | 9/2006 | Cassel | F16L 23/10 |
| 2007/0096402 | A1 * | 5/2007 | Lingenfelder | F16L 23/18 |
| 2011/0042947 | A1 * | 2/2011 | Hansen | F16L 23/10 |

OTHER PUBLICATIONS

A marketing poster ot the Applicant (2 pages): titled as "SMART seal PRISM OneKit TM (upper right corner of 1 st page), dated as Jul. 2017 (bottom left corner of 1st page), published in US. It was used for promoting Applicant's products including the Seal Assembly, which is commercially known as 'PRISM OneKit TM ", during the annual microelectronics trade fair "SEMICON West 2017" held in San Francisco, between the dates Jul. 11-13, 2017.

KA Purchase Order (PO) (2 pages) dated Jan. 13, 2017, which was prepared by a customer and sent to the Applicant. The PO shows the Seal Assembly (O-Ring Assembly), which is commercially known as "PRISM OneKit TM ", in the listed items.

Applicant's USPTO Trademark application for "PRISM OneKit TM" seal assembly filed on Mar. 5, 2018 (7 pages). Page 2 of the TM application shows " First Use Anywhere date, and First Use in Commerce Date" at least as early as Jan. 1, 2017.

* cited by examiner

UNIVERSAL VACUUM FITTING CLAMP WITH TORQUE CONTROL

CROSS REFERENCE TO RELATED APPLICATION

This application relates to and claims priority from U.S. provisional patent application No. 62/747,653 filed on Oct. 18, 2018, which is expressly incorporated by reference herein in its entirety.

BACKGROUND

Field of the Invention

The present invention relates to flange clamp assemblies and, more particularly, to flange clamps, using sealing assemblies, with torque control features.

Description of the Related Art

In time, sealing effectiveness or performance of a seal held by a clamp is reduced, which leads to replacement of the seal, only if this performance reduction is detected before a leak because of the failing low performance seal. Furthermore, when a sealing clamp is used to apply pressure on a seal between the pipe flanges, an inadequate or over pressure or torque applied by the clamp on the seals can also lead to seal failure.

A sealing clamp can benefit from a feature that would allow observation of the condition of the seals or authentication of the seals so that a replacement can be done on time before a seal failure. Sealing systems can benefit from clamps that can apply or maintain required pressure on the seal during the seal's life time.

SUMMARY

An aspect of the present invention includes a sealing system for establishing sealing between two flange members, comprising: a seal assembly disposed between a first flange member and a second flange member, the seal assembly including a gasket supported by an outer seal component and an inner seal component, and a clamp including a first clamp arm and a second clamp arm, each of the first and second clamp arms including first and second back end portions and first and second front end portions respectively, the first and second clamp arms being hingedly joined at the first and second back end portions, the first and second clamp arms being adapted to receive the flange members and the seal assembly positioned between the flange members, wherein each of the first clamp arm and the second clamp arm includes at least one opening enabling visual inspection of the outer seal component of the seal assembly that displays an indicator that provides information about the gasket of the seal assembly; and a coupling device of the clamp for drawing the front end portions of the clamp arms toward one another to tighten the clamp until a predetermine torque value being reached around the flange members to urge the flange members toward one another to compress the gasket supported by the outer seal component and the inner seal component of the seal assembly to establish sealing between the flange members at a predetermined torque, wherein the predetermined torque value is reached by advancing a torque head of the of the coupling device toward a base structure located on the first front end portion of the first clamp arm until a first protrusion on the torque head is blocked by a second protrusion on the base structure.

Another aspect of the present invention includes a clamp system for applying torque in real time, comprising: a seal assembly disposed between first and second flanges, the seal assembly including an o-ring seal supported by an outer seal support ring and an inner seal support ring; a clamp including a first clamp arm and a second clamp arm, each of the first and second clamp arms including first and second back end portions and first and second front end portions that are outwardly projected, the first and second clamp arms being hingedly joined at the back end portions, the first and second clamp arms being adapted to receive the flange members and the seal assembly positioned between the flange members; a base structure formed on the first front end portion, the base structure having a base surface and a base recess formed in the base surface, the base surface having a stop marker including a protrusion at a predetermined location on the base surface; a swivel bolt being movably connected to the second front end portion so as to be movably received by the first front end portion; a torque head for threadingly engaging the swivel bolt to draw the first and the second clamp arms together, the torque head comprising a body having a chamber separated from a knob portion by an inner wall, the chamber extending between an opening defined by a circular edge at a first end of the body and the inner wall while the knob portion extending from the inner wall to a second end of the body; wherein a torque marker including another protrusion is on the circular edge of the chamber; a spring received in the chamber of the torque head so that a first end of the spring is positioned in the base recess and a second end of the spring rests against the inner wall to urge the base structure and the inner wall away from each other as the torque head is advanced toward the base structure resulting in applying force to the spring until the stop marker on the base surface blocks the torque marker of the torque head to apply the predetermined torque to clamp arms, the clamp system further including at least one opening in each of the first clamp arm and the second clamp arm, the at least one opening enabling visual inspection of the outer seal support ring of the seal assembly that displays an indicator that provides information about the o-ring seal of the seal assembly.

DETAILED DESCRIPTION

Before explaining the present system in detail, it is to be understood that the system is not limited to the particular embodiments and that it may be practiced or carried out in various ways.

In one embodiment, the present invention provides a sealing system including a coupling assembly having a coupling device, for example a universal vacuum fitting clamp with torque control for establishing sealing between two sealable surfaces such as flanges. The coupling assembly of the present invention may apply force to flanges holding a sealing assembly disposed between flanges to establish a sealed connection. The coupling device is adapted to apply and maintain force or torque in real time to the coupling assembly to maintain a desired clamping pressure on the flanges.

The coupling assembly of the present invention may include a generally circular clamp body which may have a first clamp arm which is hingedly joined to a second clamp arm. An inner recess, or groove, or channel, having slanted top and bottom walls, may extend through the inner side of the first and second clamp arms. The inner recess may be configured to receive the flanges and the seal assembly positioned therebetween to apply pressure and sealably connect the flanges.

In the coupling assembly of the sealing system of the present invention, each of the first clamp arm and the second clamp arm may include at least one opening or window. The openings or windows may extend to the inner recess of the clamp body to expose a portion of an outer seal component of the seal assembly including an indicator configured for displaying an aspect of the sealing assembly related to the sealing performance or seal authentication.

Figure 1A:
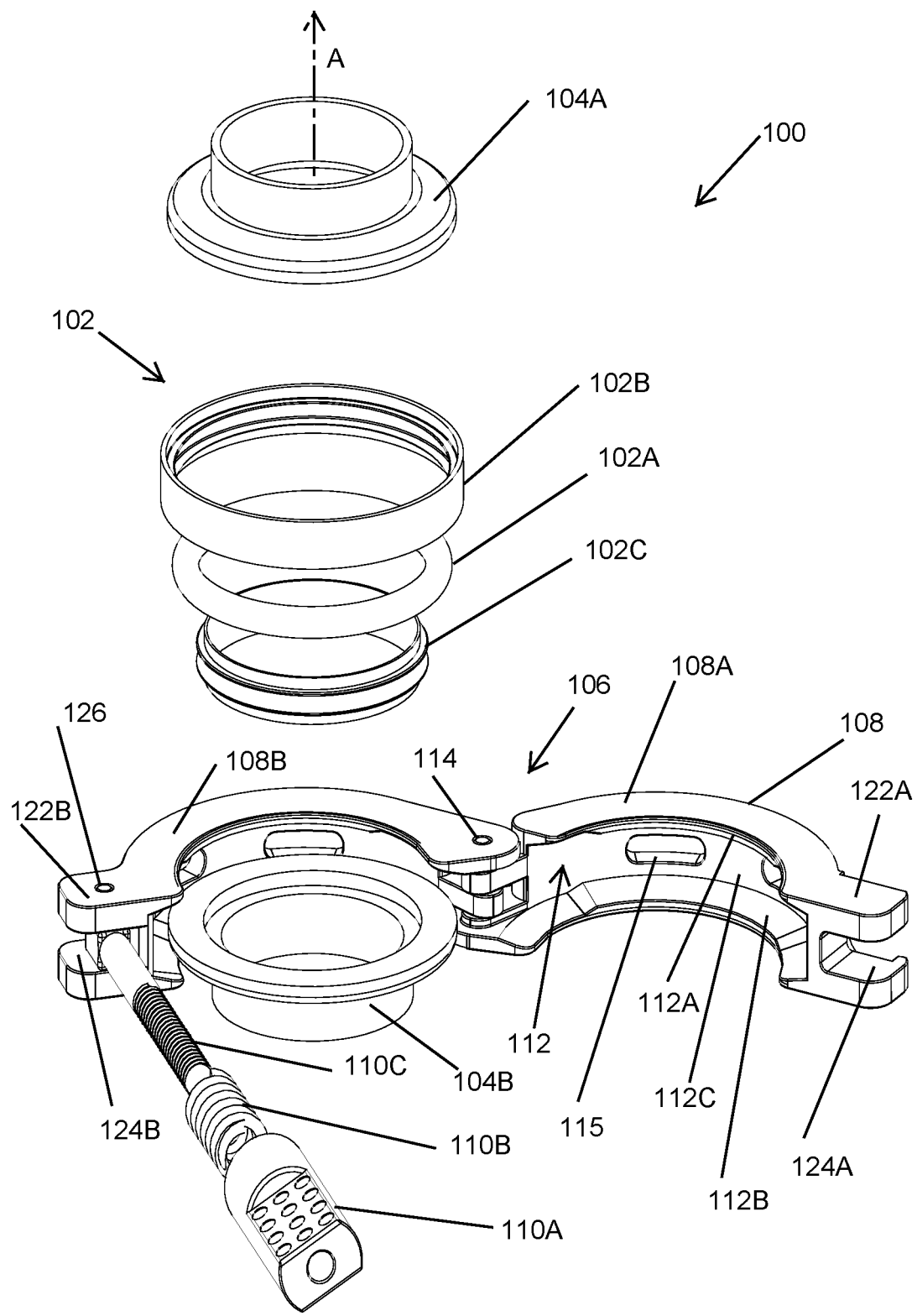
FIG. 1A is a schematic illustration of an embodiment of a sealing system including a coupling assembly and a sealing assembly in exploded view.
Figure 1B:
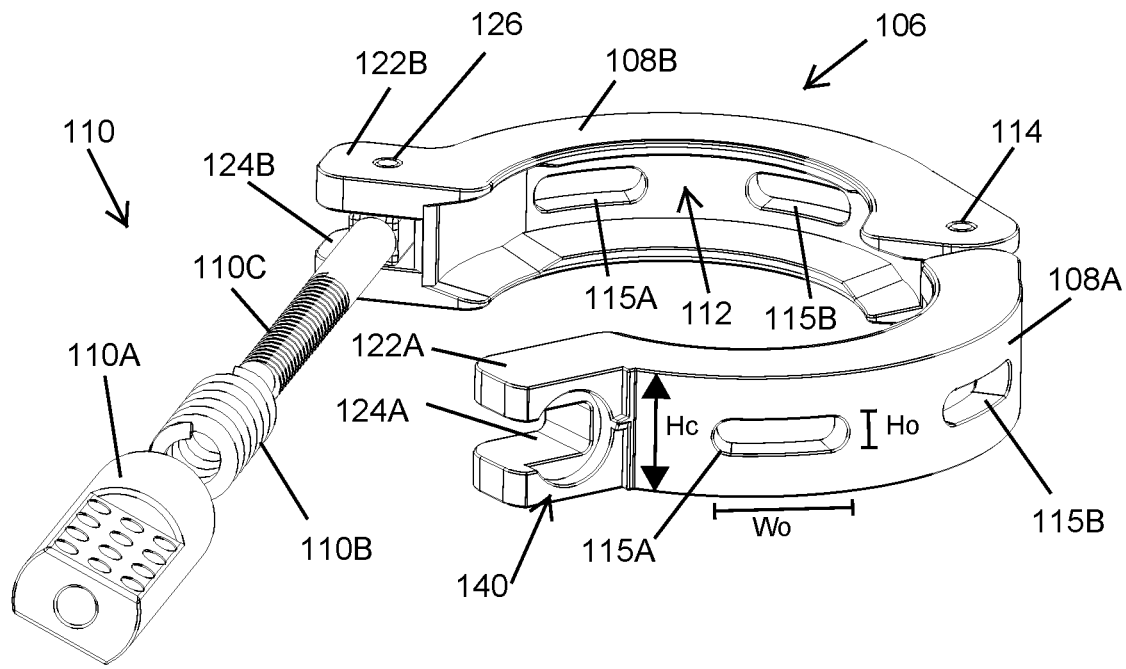
FIG. 1B is a schematic illustration of the coupling assembly shown in FIG. 1A.

Referring to FIGS. 1A-1B, an exemplary sealing system 100 of the present invention may include a coupling assembly 106 having a clamp body 108 (clamp) and a coupling device 110 which may or may not be integrally connected to the clamp body 108. The clamp body 108 may include a first clamp arm 108A or a first claw and a second clamp arm 108B or a second claw. The coupling device 110 may include a torque head 110A, a spring 110B, and a bolt 110C (threaded fastener). The sealing system also includes a pair of flange members 104, such as pipe flanges, and a seal assembly 102. The flange members may include a first flange member 104A and a second flange member 104B. The first and second clamp arms 108A, 108B may have generally a curved shape, or arcuated shape, to surround generally circular flange members. The centers of the flange members 104, the seal assembly 102 and the clamp body 108 may be positioned along a system axis 'A'.

A hinge member 114 of the clamp body 108 may hingedly join back ends of the first clamp arm and second clamp arm to move them relative to one another as the first clamp arm 108A and the second clamp arm 108B moved between the open position and the closed position of the clamp body 108. An inner recess 112, or a groove 112, may have generally U-shape and extend through the inner side of the first and second clamp arms 108A, 108B. The inner recess 112 may be defined by a top wall 112A (inner top wall), a bottom wall 112B (inner bottom wall) and a side wall 112C (inner side wall) of the clamp body 108. The inner recess 112 may be configured to receive the flange members 104 and the seal assembly 102 positioned between the flange members when the clamp body 108 is operated during a clamping operation to securely seal the flange members 104.

In one embodiment, both the top wall 112A and the bottom wall 112B of the inner recess 112 may be slanted and form an angle between the sidewall 112C. Exemplary dimensions and an exemplary embodiment of the inner recess 112 of the clamp body 108 may be seen in the cross sectional view shown in FIG. 4B. Front ends of the first clamp arm 108A and the second clamp arm 108B may include end portions 122, such as a first front end portion 122A and a second front end portion 122B extending outwardly from the clamp arms 108A, 108B. Each of the front end portions 122A, 122B may include channels 124, such as a first channel 124A and a second channel 124B to receive and retain the bolt 110C of the coupling device 110. A joint member 126 may movably hold an end of the bolt 110C within the second channel 124B so that the bolt 110C may be moved in and out of the first channel 124A. In this embodiment, the hinge member 114 and the joint member 126 may be tight tolerance press-fitted stainless steel dowel pins. All components of the clamp body may be made out of metal or metal alloys, preferably stainless-steel.

The seal assembly 102 used with the present invention has a circular shape. The seal assembly 102 has a center seal component 102A, or a seal 102A, which is a circular seal, an outer seal component 102B, or an outer ring 102B, and an inner seal component 102C, or an inner ring 102C. The seal 102A is an o-ring or gasket. The outer ring 102B may be an overpressure ring supporting the outer perimeter of the seal 102A. The inner ring 102C may be a centering ring supporting the inner perimeter of the seal 102A. The seal assembly 102 is commercially available from the assignee of the present invention as fitting or seal gasket in various sizes such as NW25, NW40 and NW50. The seal 102A is a polymer, for example elastomer. The outer ring 102B and inner ring 102C may be made of metallic materials, such as stainless steel or aluminum or aluminum alloys. During a sealing operation, as the first and second clamp arms 108A, 108B are moved from open position to closed position or operation position to apply radial forces to the flanges members 104 by the inner recess walls 112A and 112B, the flange members 104 are urged toward each other to apply opposing vertical forces to the seal 102A held between the outer and inner rings 102B, 102C. Dimensions of the seal assembly components 102A, 102B and 102C may vary depending on the application and the flange sizes.

During a sealing operation the front end portions 122A and 122B may be fastened together by extending the bolt 110C through the channels 124A, 124B, through the spring 110B, which is placed between the front end portion 122A and the torque head 110A, and threadedly engaging the bolt 110C with the torque head 110A. As the torque head 110A of the coupling device 110 is tightened, i.e., twisted around the bolt 110C, force applied by the spring 110B biased by the torque head 110A against the first end portion 122A draws the front end portions 122A and 122B together. The coupling device 110 may hold the first clamp arm 108A and the second clamp arm 108B in the closed position and keep applying torque in real time with the compressed spring as the clamp arms are held together in closed position. In one example, for a clamping application, the applicable torque value may be factory preset through predefined length of the spring, the end user or the customers may need to tighten the torque head until a preset stopping indicator or a locking indicator. The coupling device 110 may be capable of maintaining in real time the amount of vertical forces and the radial forces exerted by the clamp arms 108A, 108B on the seal assembly 102 held between the flange members 104 when the clamp arms drawn together by the coupling device 110. An example of the torque value may be approximately 0.4 ft·lb.

As will be more fully described below, the torque head 110A may have a torque control indicator (mark) or mechanism that may stop further tightening of the clamp arms 108A, 108B once the desired force is applied to draw the clamp arms together. The spring 110B may be a custom made stainless steel spring. In one example, the spring 110B may preferably be a counterclockwise direction spring having about seven coils with a wire diameter of about 0.08 inches with +/−0.0008. An exemplary outer diameter of the spring may be about 0.435 inches with +/−0.008 and an inner diameter of the spring may be about 0.275 inches with +/−0.008. A free length of the spring may be about 0.875 inches with +/−0.025. End type of the spring may be closed and squared type. An exemplary spring material type may be SST 304 stainless steel with spring rate of about 190 lbf/in with +/−10%. The critical tolerances of the spring are required to eliminate any risk of looseness caused by the vibration or other working conditions. Counterclockwise direction spring is designed to counterbalance the rotation of the torque head so that it will not create unnecessary force and stress on the spring.

In one embodiment, the bolt 110C may be a stainless steel swivel bolt having a flat end with an eye opening at one end and a threaded portion beginning from the other end of the bolt and extending, for example, about ⅔ of the length of the bolt. The bolt 110C may be movably pinned to the front end portion 122B, and the threaded portion threads into the torque head 110A when the two are engaged. In one example, the bolt 110C may have a length of about 2.628 inches and with ¼-20 thread for total length of 1.369 inches. The preferred ¼-20 thread is stronger and thicker in comparison to commonly used 10-32 thread. An exemplary diameter of the bolt 110C may be about 0.250 inches and an exemplary diameter of the eye opening through the flat end may be about 0.125 inches. In an alternative embodiment, the bolt 110C may not be a swivel bolt and may not be pinned to the front end portion 122B. In this alternative approach, the bolt may be removably attached to the second front end portion 122B.

Referring back to FIGS. 1A-1B, each of the first and second clamp arms 108A and 108B may include one or more openings 115 (windows or view ports), such as a first opening 115A and a second opening 115B. The openings 115 may extend to the inner recess 112 to expose a portion of outer seal component 102B of the seal assembly 102 held between the first and second flanges. The openings 115 may be used to observe the seal assembly 102 held in the clamp body 108 during use without needing to shut down the system they are used with and without disassembling the sealing system 100 for the purpose of inspecting the seal assembly 102. The openings 115 may have a rectangular shape with rounded short ends. The windows may have a width 'Wo' in the range of about 0.560-0.710 inches and a height 'Ho' in the range of about 0.100-0.275 inches for a clamp wall height 'Hc' in the range of about 0.500-0.750 inches and a clamp wall thickness in the range of about 0.150-0.275 inches. An exemplary distance between the openings 115 may be about 0.200-0.650 inches.

Utilizing the openings 115, an operator may visually inspect the sealing assembly 102, specifically the outer ring 102B, while the clamp body 108 is in torque applied state. The outer ring 102B may include an indicator configured for visually displaying an aspect of the sealing assembly 102, or the seal 102A, which is related to the sealing performance or seal authentication. The indicator may be an authentication indicator displayed by the outer ring 102B. In one embodiment, the authentication indicator may have a specific identifying color assigned to the seal assembly 102 to authenticate the seal 102A, for example, for the purpose of replacing it with a new seal assembly having the same type of seal during maintenance. The color of the outer ring 102B may be either for material identification of the seal 102A, and/or other identifications such as size and material properties. Wears/damages or build-ups seen on the sealing assembly 102 during the inspection may only indicate the condition of the outer ring 102B, and may or may not indicate the condition of the seal 102A nor the inner ring 102C. The color on the outer ring 102B of the seal assembly 102 may correspond to recorded information identifying the seal 102A, such as part number, material, model, and date of installation of the sealing assembly 102, the installation location information and the like to assist operators during maintenances. For example, red color may indicate perfluoroelastomer material and blue color may indicate fluoroelastomer material.

Figure 2:
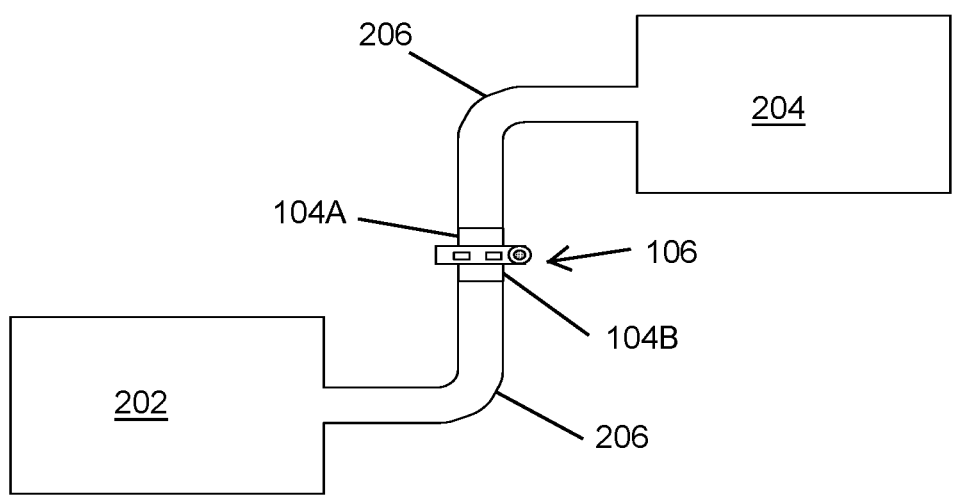
FIG. 2 is a schematic illustration of an exemplary vacuum system using the sealing system of the present invention.

Referring to FIG. 2 an exemplary system 200, such as a vacuum system, may include a vacuum pump 202 that is sealably connected to a vacuum chamber 204 through the sealing system 100 of the present invention. The flange members 104 may be part of such systems, or connected to them via pipes 206 or conduits. During the operation as gases pass through the pipes 206 connected by the sealing system 100, the sealing system 100 seals the piping 206 to prevent gas from leaking that can lead to vacuum failure and also hazardous conditions in the workplace. In system 200, the seal assembly 102 in the sealing system 100 may be inspected and replaced, during regular maintenance intervals, with the correct seal assembly without any uncertainty or confusion. In one process example, flange members 104 are connected to exhaust and line pipings and merged together with the seal assembly 102 by positioning it between the flange members 104A, 104B. Next, the clamp arms 108A, 108B are wrapped around the flange members, and to create sealing force, and the coupling device 110 is tightened to the recommended torque range. The system of the present invention may, for example, be used for the vacuum pump applications such as exhausts, forelines, and heated trace lines in sub-fabrication in semiconductor industry.

Figure 3A:
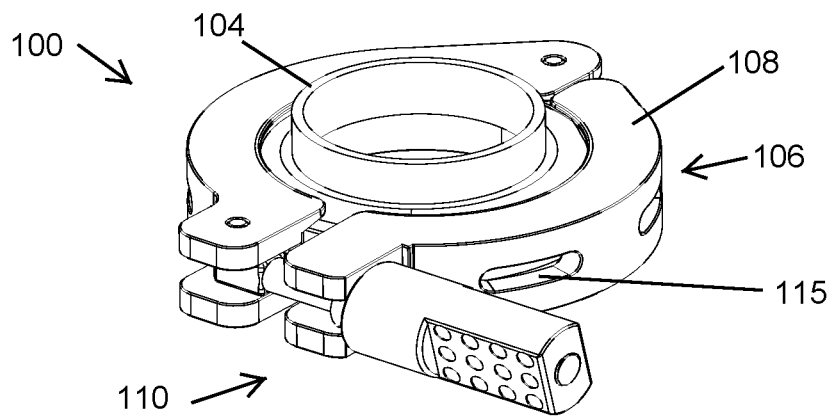
FIGS. 3A-3C are schematic illustrations in perspective, top and side views showing the coupling assembly in closed position holding the seal assembly.
Figure 3B:
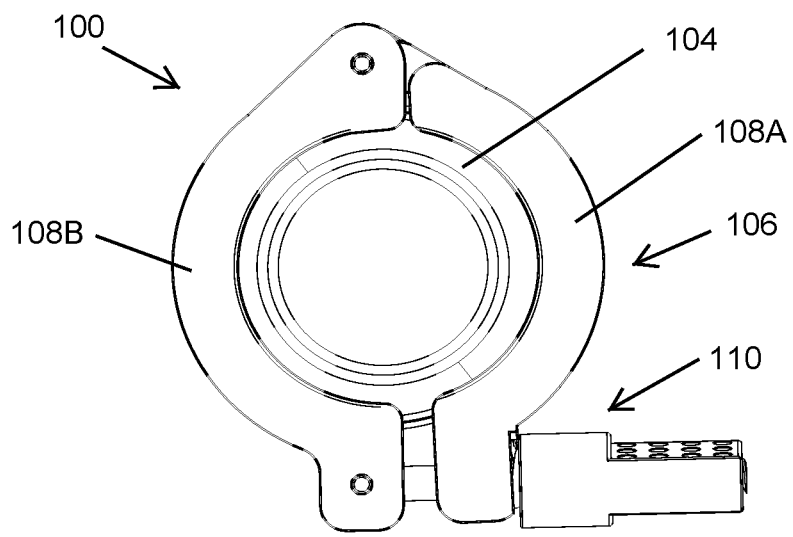
Figure 3C:
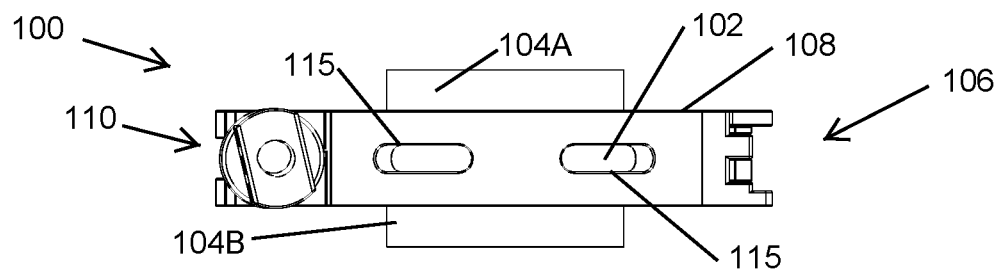

FIGS. 3A-3C, in schematic perspective, top and side views, show the sealing system 100 in closed position, where the clamp arms 108A, 108B enclose the outer perimeters of the flange members 104 having the seal assembly 102 between them. In the figures, the coupling device 110 is engaged and fully tightened to exert the predetermined torque value on the combination of the flange members 105 and the seal assembly 102. As opposed to the prior art sealing systems or clamps without openings, the openings 115 in the clamp arms 108A, 108B of the present invention allow a user to visually inspect the sealing assembly 102 as described above. This feature of the sealing system 100 may facilitate fast and safe replacement of the seal assembly 102 with the correct replacement seal assembly for that specific clamp, thereby preventing fluid leaks resulting in catastrophic failures and operation down times. It will be readily appreciated that this aspect of the present invention, which introduces safely inspection of the seals for the right replacement without shutting down a system, such as a vacuum system, as exemplified in FIG. 2, provides many benefits. The benefits may be operation cost saving and prevention of operation mistakes involving installment of wrong seal parts, especially in the large industrial facilities and laboratories which may use a plurality of such systems using different seal parts.

Figure 4A:
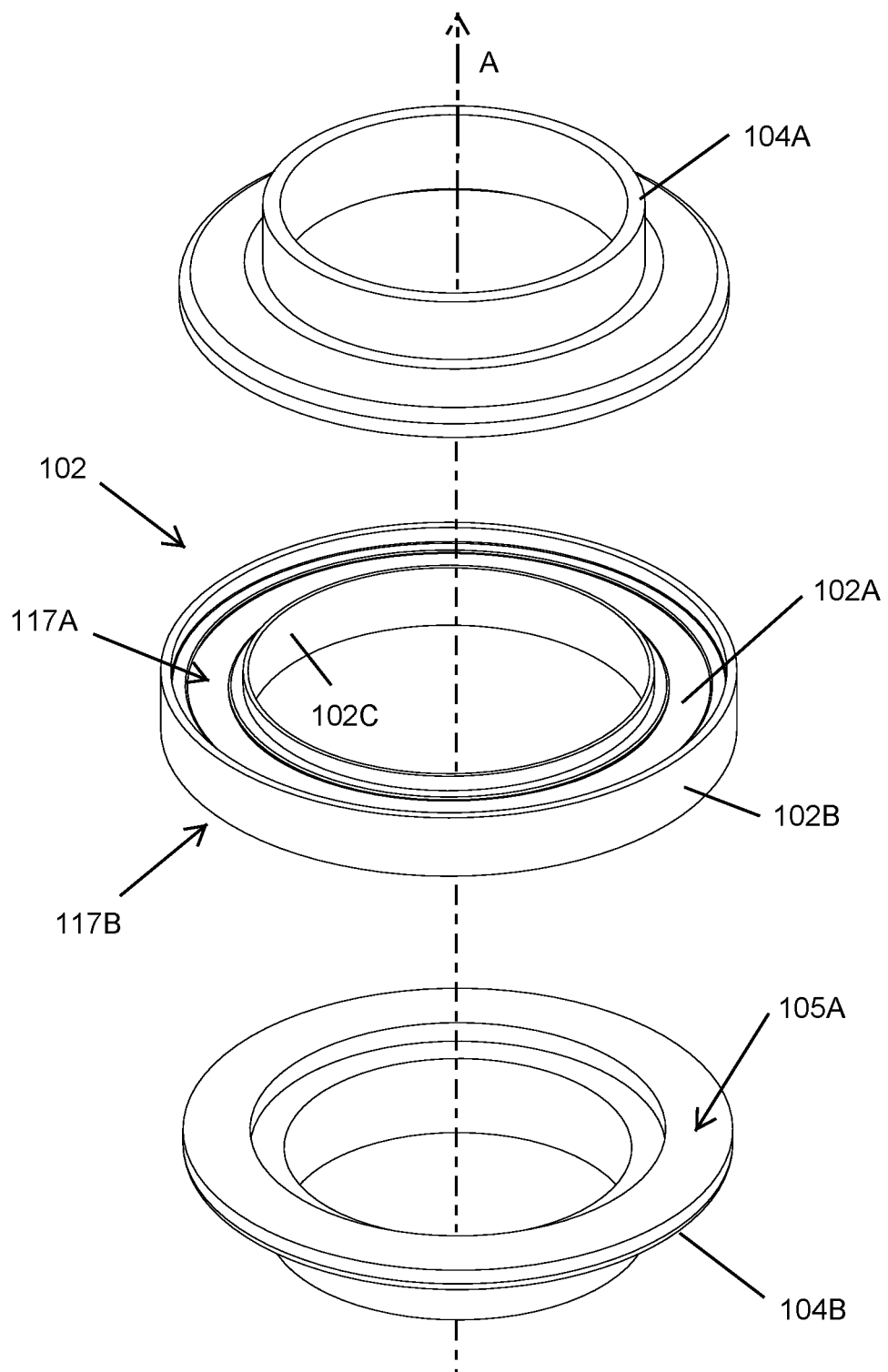
FIG. 4A is a schematic illustration of a sealing assembly with flange members before the flange members are applied top and bottom of the seal assembly.

FIG. 4A shows the seal assembly 102 between the flange members 104A and 104B. As described above, the seal assembly 102 may have the seal 102A, the outer ring 102B, and the inner ring 102C. In one example, an exemplary inner diameter of the seal 102A may be about 40.64 mm and the cross sectional diameter Ro may be 5.33 mm. Thickness Tp or the height of the outer ring 102B may be about 8 mm, and the thickness Tc or the height of the inner ring may be about 8 mm. The Tp value may be greater than the Tc value which may be greater than the Ro value.

Figure 4B:
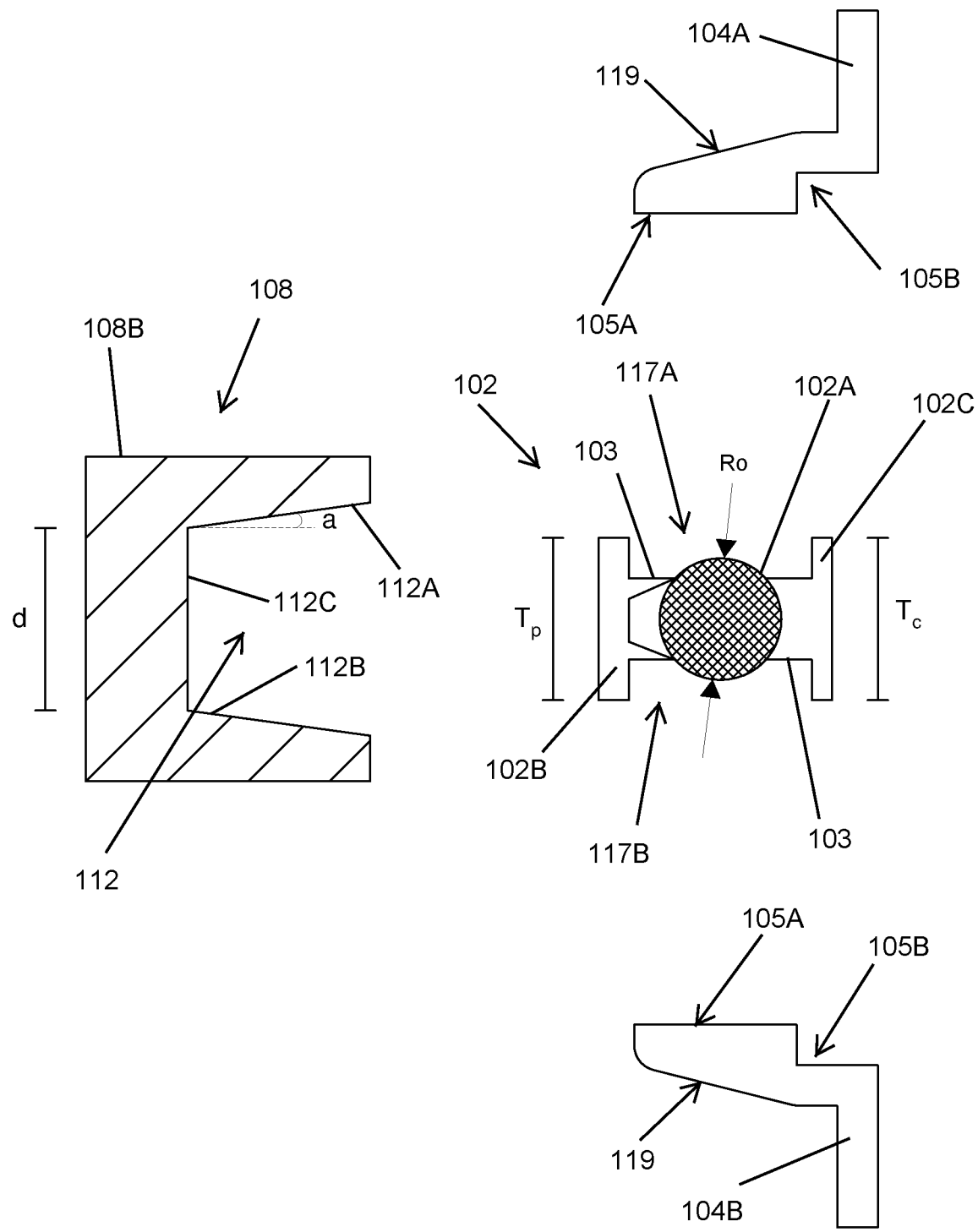
FIG. 4B is a schematic illustration in cross-sectional view showing a clamp arm, seal assembly components and flange members.

Referring to FIG. 4B, the seal 102A in the sealing assembly 102 may be tightly held between the facing side walls of the outer ring 102B and the inner ring 102C by support members 103 protruding from the facing side walls of them. The support members 103 include concave surfaces to tightly hold the seal 102A while exposing top and bottom surfaces of the seal 102A to be contacted by the surfaces 105A of the flange members 104. Exposed top and bottom surfaces of the seal 102A may be exposed within an upper recess 117A and a bottom recess 117B formed by the facing inner side walls of the outer ring 102B and the inner ring 102C.

In this configuration, upper and lower curved surfaces of the seal 102A may be exposed to contact with the flange surfaces 105A to establish sealing within the upper and lower recesses 117A, 117B. The flange members 104 and the sealing assembly 102 may engage by placing the flange surfaces 105A on the seal 102A exposed within the upper and lower recesses 117A, 117B of the seal assembly 102. Stepped surfaces 105B on the flange members 104 adjacent the flange bores may align the flange surfaces 105A with respect to the inner ring 102C. The flange surfaces 105A may or may not touch the support members 103 depending on the seal material, seal size and how much the seal is compressed.

Figure 5A:
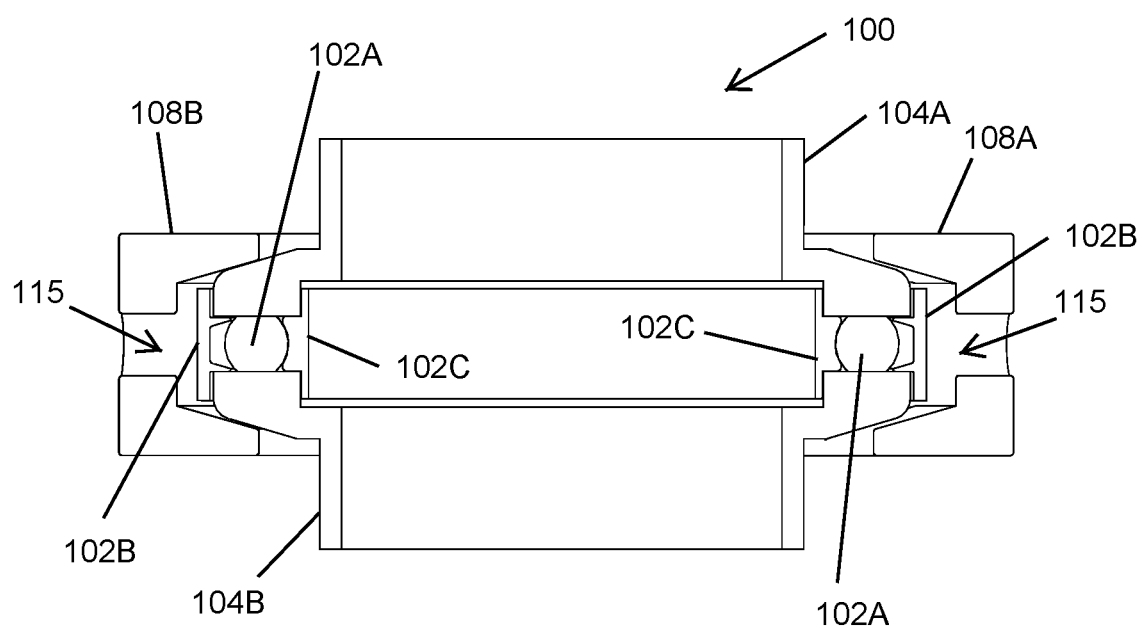
FIG. 5A is a schematic illustration of the clamp body with the seal assembly under torque which held within the inner grove of the clamp arms, which is shown in cross sectional view taken along the window openings of the clamp arms.
Figure 5B:
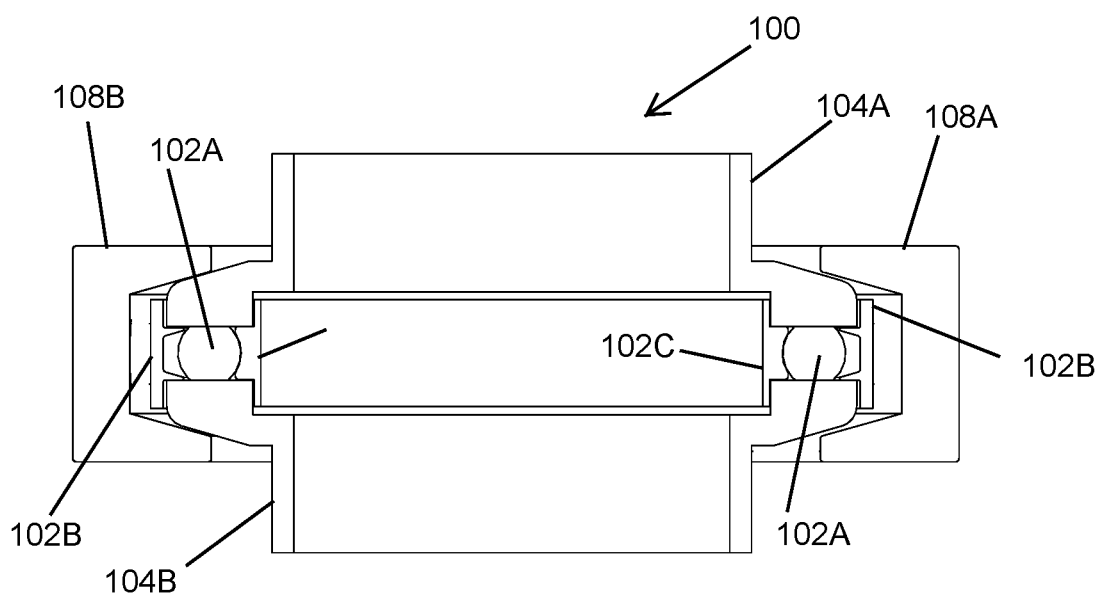
FIG. 5B is a schematic illustration of the clamp body with the seal assembly under torque which held within the inner grove of the clamp arms, which is shown in cross sectional view taken along the windowless part of the clamp arms.
Figure 6A:
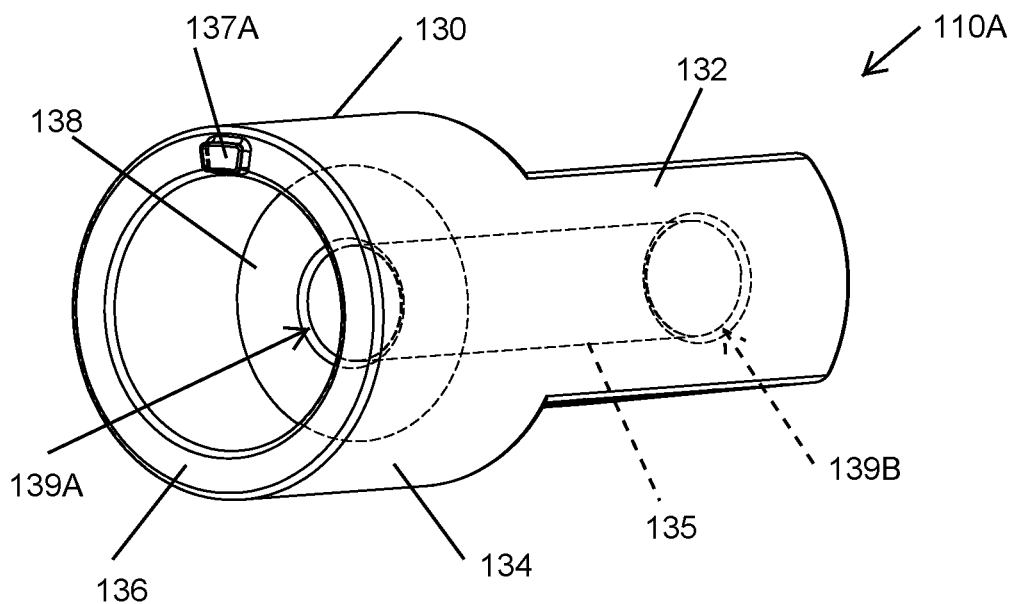
FIG. 6A is a schematic perspective view of an embodiment of a torque head of a coupling device of the clamp assembly of the present invention.
Figure 6B:
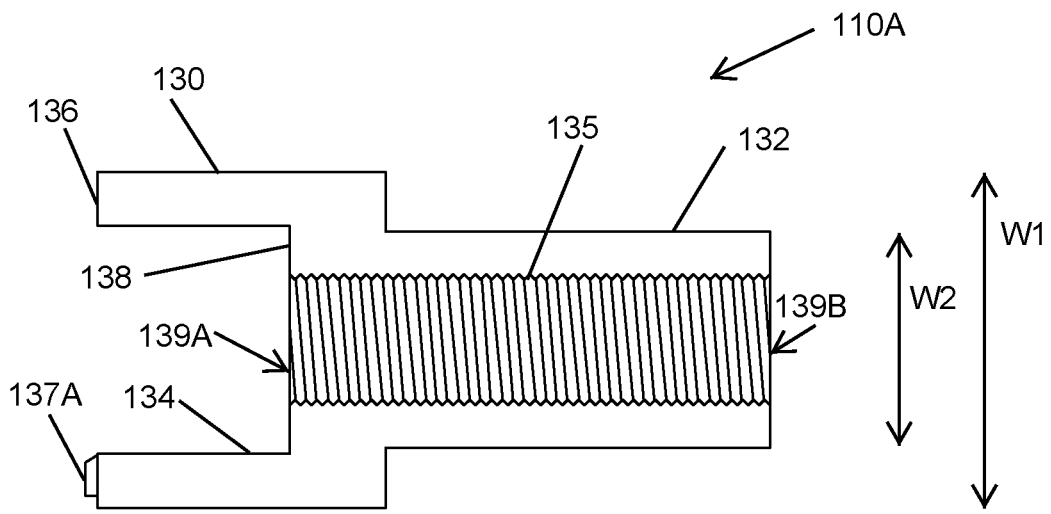
FIG. 6B is a schematic side cross sectional view of the torque head having a spring chamber portion and a knob portion.
Figure 6C:
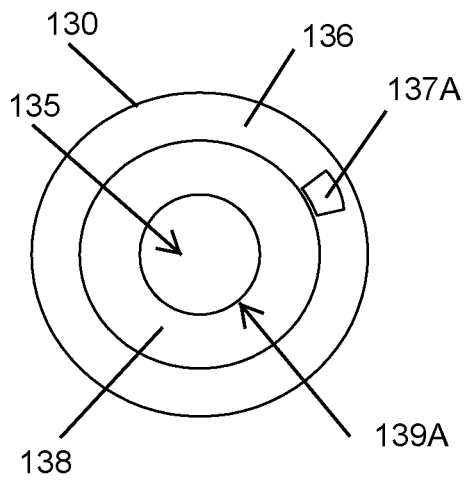
FIG. 6C is a schematic top view of a first end of the torque head showing the spring chamber opening.
Figure 6D:
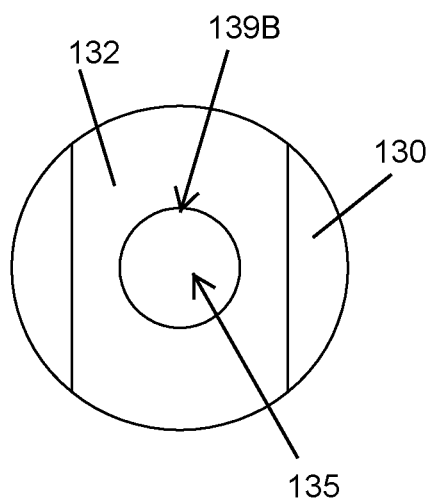
FIG. 6D is a schematic top view of a second end of the torque head showing the knob portion with a threaded bore opening.

FIGS. 5A-5B show the clamp body 108, in side cross sectional views, in closed position and the seal 102A in the seal assembly 102 is compressed in torque applied state with cross sectional views taken along windowed sections and windowless sections of the clamp arms 108A, 108B, respectively. Referring to FIGS. 4B, 5A and 5B, after contacting the flange surfaces 105A to the seal 102A, the clamp arms 108A, 108B are tightened around the flange members 104. As the torque is applied, slanted top and bottom walls 112A and 112B of the clamp arms 108A, 108B may begin to exert pressure on the outer surfaces 119 of the flange members 104A and 104B, which result in vertically moving them toward the seal 102A in the seal assembly 102, thereby establishing sealing by clamping in the system 100 of the present invention. An exemplary slant angle 'a' for the top and bottom walls of the inner recess 112 may be about 14.6 degrees with +0.3 degrees. An exemplary side wall 112C height may be about 0.346 inches. The clamp body inner recess 112, the top and bottom walls 112 may require a specific angle to provide a good contact between the top wall 112A, bottom wall 112B and the flange outer surfaces 119 to prevent any hardware damage such as bent on the top and bottom walls 112A, 112B and scratches on the flange outer surfaces 119 and the top and bottom walls 112A, 112B.

Referring to FIGS. 6A-6D, the torque head 110A of the coupling device 110 may include a generally cylindrical spring chamber 130 and a knob portion 132, or knob, extending from the spring chamber 130. The knob portion 132 of the torque head 110A may functionally resemble a nut (fastener) to tighten or untighten the torque head 110A, manually or using a tool. The spring chamber 130 of the torque head 110A may include a chamber sidewall 134 having a circular edge 136, or an edge portion 136, forming the circular opening of the spring chamber 130 that receives the spring 110B. The chamber side wall 134 may have an exemplary thickness of about 0.179 inches and a height of about 0.394 inches. The edge 136 may include a protrusion 137A, or a stop, which may be a rectangular prism shape protrusion extending orthogonally away from the surface of the edge 136 of the spring chamber 130. The protrusion 137A will be referred to as the first protrusion 137A or the torque marker 137A hereinafter. The first protrusion 137A is securely joined with the edge 136 and may be an integral part of the spring chamber 130. In one embodiment, the first protrusion 137A may be formed as an integral part of the torque head 110A during a machining operation. The first protrusion 137A may have a height in the range of about 1-3 mm, and length and width in the range of about 2-3 mm. The spring chamber 130 connects to the knob portion 132 through a circular inner wall 138 having an inner opening 139A. An inner channel 135 may extend throughout the knob portion 132 and between the inner opening 139A in the inner wall 138 and an outer opening 139B at the free end of the knob portion 132. The knob portion 132 may be shaped generally as a rectangular prism, having a flat top surface and a flat bottom surface connected by curved side walls, to facilitate easy rotation of the torque head 110A. The flat surfaces of the knob portion 132 may be textured or roughened to facilitate easy gripping of the knob portion when rotating the torque head 110A, manually or using a tool.

Figure 7:
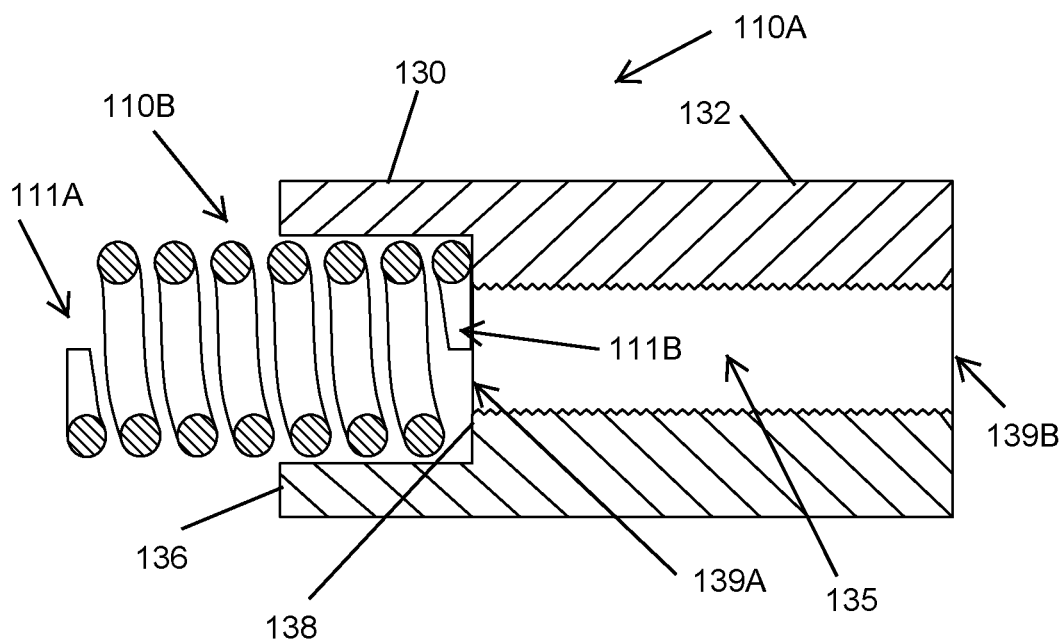
FIG. 7 is a schematic longitudinal cut view of the torque head while retaining a spring within the spring chamber.

FIG. 7 shows a cross section of the torque head 110A having the spring chamber 130 and the knob portion 132 extending from the inner wall 138 of the spring chamber 130. The inner channel 135 extending between the inner and outer openings 139A, 139B may be a threaded bore having treads mating with the threads on the bolt 110C so as to establish a threaded connection between the two. Before connecting the bolt 110C to the torque head 110A, the spring 110B is placed into the spring chamber 110A. At the uncompressed state, a first end 111A of the spring 110B may extend out of the spring chamber 130 while a second end 111B of it rests on the inner wall 138. The diameter of the spring 110B may be substantially close to the inner diameter of the spring chamber 130. Spring diameter, spring length and other properties of the spring may be selected based on the required torque value for the specific application and the type of seal 102A. The spring 110B is not a captive spring, i.e., it is not a permanent part of the torque head 110A. The spring 110B can be removed during maintenance of the clamp 108 along with the torque head 110A.

Figure 8:
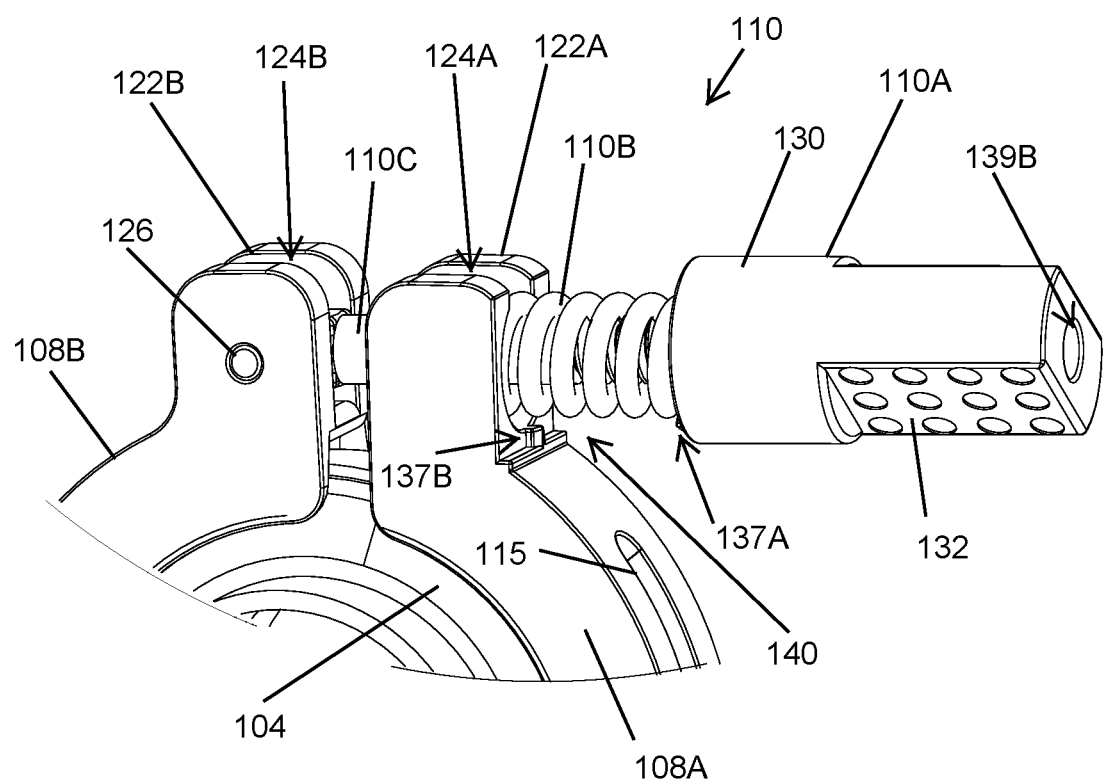
FIG. 8 is a schematic view of a front end of the clamp assembly with the coupling device positioned against a base structure on an end portion of a first clamp arm before the application of torque.

FIG. 8 shows the front end portions 122A, 122B of the first and second clamps 108A, 108B, which are brought together, and the coupling device 110 before the application of torque. At uncompressed state, the first end 111A of the spring 110B is received by a base structure 140, or a base 140, formed in an outer surface 123A of the first end portion 122A of the first clamp arm 108A, while the second end 111B of the spring 110B rests against the inner wall 138. As the torque head 110A is advanced on the tensioning rod 110C toward the base structure 140 by rotating the torque head 110A, the spring 110B is compressed between the base structure 140 and the inner wall 138 of the spring chamber 130.

Figure 9A:
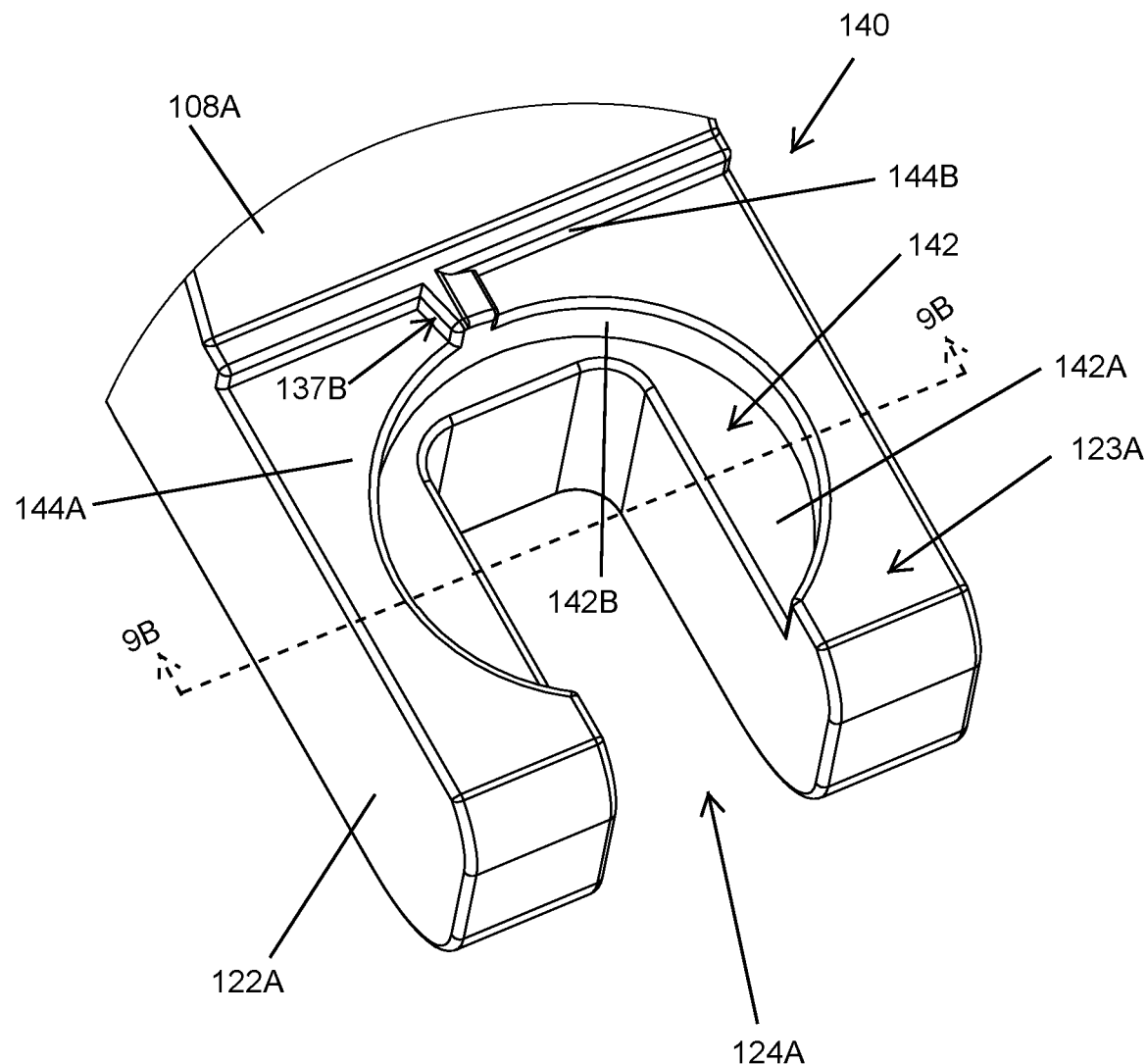
FIG. 9A is a schematic perspective view of the end portion having the base structure.
Figure 9B:
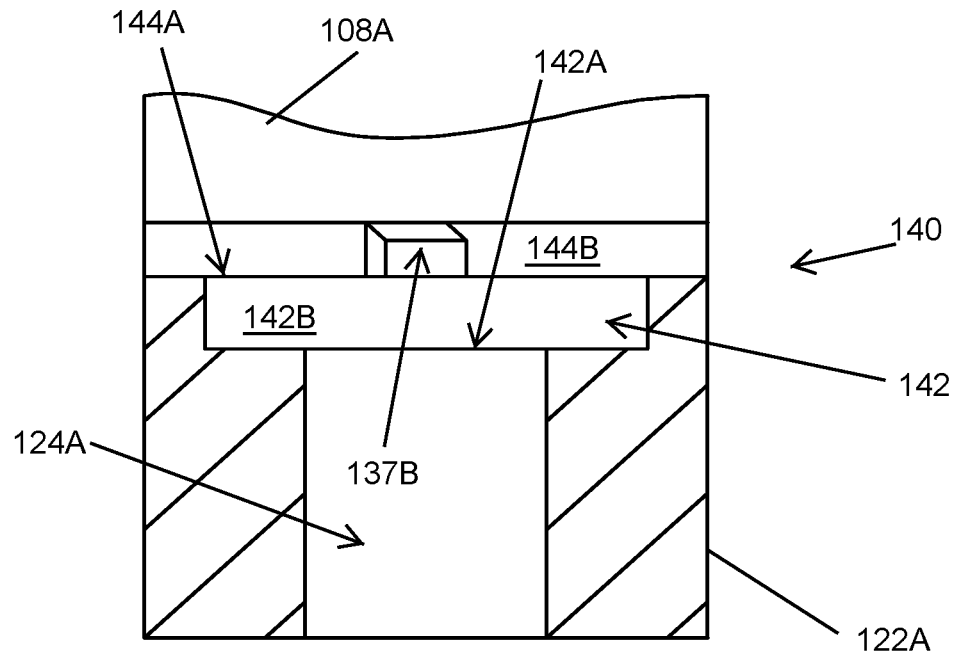
FIG. 9B is a schematic cross sectional view of the end portion having the base structure.

FIGS. 9A-9B show, in perspective and frontal cross-sectional views respectively, the base structure 140 on the first front end portion 122A. The base structure 140 may include a circular spring recess 142 formed in a base surface 144A. The spring recess 142 may have a flat bottom wall 142A, adjacent the first channel 124A, and a generally circular side wall 142B extending generally vertically between the base surface 144A and the bottom wall 142A. The spring recess 142 may be sized to receive the first end 111A of the spring 110B. The spring recess 142 may retain at least a portion of the first coil of the spring 110B. The circular side wall 142B of the recess 142 may have a height in the range of about 1-4 mm. The base surface 144A may be a raised surface above the spring recess 142, which may flush with the top edge of the circular side wall 142A. The base structure 140 may also include a base side wall 144B, extending upwardly from the base surface 144A, adjacent where the front end portion 122A meets the curved part of the clamp arm 108A. The base side wall 144B may have a height in the range of about 1-3 mm.

The base surface 144A may include a protrusion 137B, or stop, which is a rectangular prism shape protrusion located at a predetermined location at about the middle of the base side wall 144B and extending orthogonally away from the base surface 144A of the base structure 140. The protrusion 137B is securely joined with both the base surface 144A and the side wall 144B and may be an integral part of the base structure 140. The protrusion 137B will be referred to as the second protrusion 137B or the stop marker 137B hereinafter. In one embodiment, the second protrusion 137B may be formed as an integral part of the base structure 140 of the first clamp arm 108A during a machining operation during manufacturing of the clamp parts. In one embodiment, the second protrusion 137B may have a height in the range of about 1-3 mm, and length and width in the range of about 2-3 mm. The first protrusion 137A and the second protrusion 137B may have the same dimensions.

The first protrusion 137A is related to the predetermined torque value applied by the coupling device 110A. When the first protrusion 137A is blocked by the second protrusion 137B, the torque head 110A may not be further advanced thereby the coupling device 110A may be locked at the predetermined torque value.

Figure 9C:
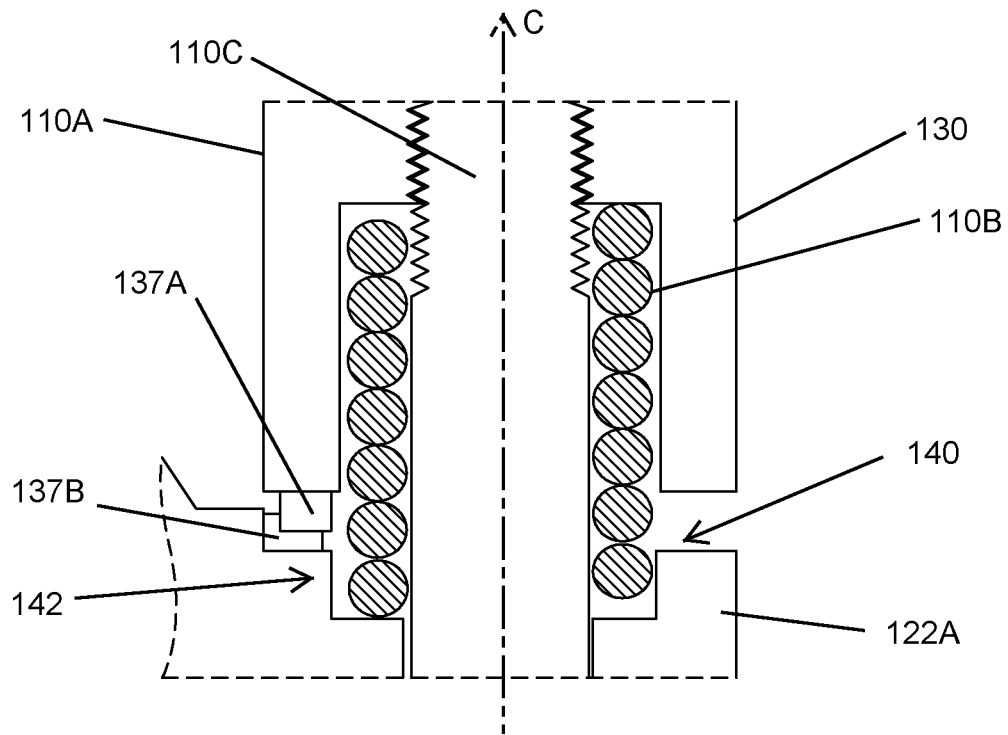
FIG. 9C is a schematic cross sectional view taking along an axis of rotation showing the torque head engaged and locked with the base structure so that the spring urges the torque head and the base structure away from each other with a constant load.

FIG. 9C shows, in cross section along an axis of rotation C, the coupling device 110 in fully tightened position when the torque head 110A is in full engagement with the base structure 140 on the first end portion 122A. The spring 110B is compressed around the bolt 110C and confined within the space formed by the spring chamber 130 and the base structure 140.

Figure 10A:
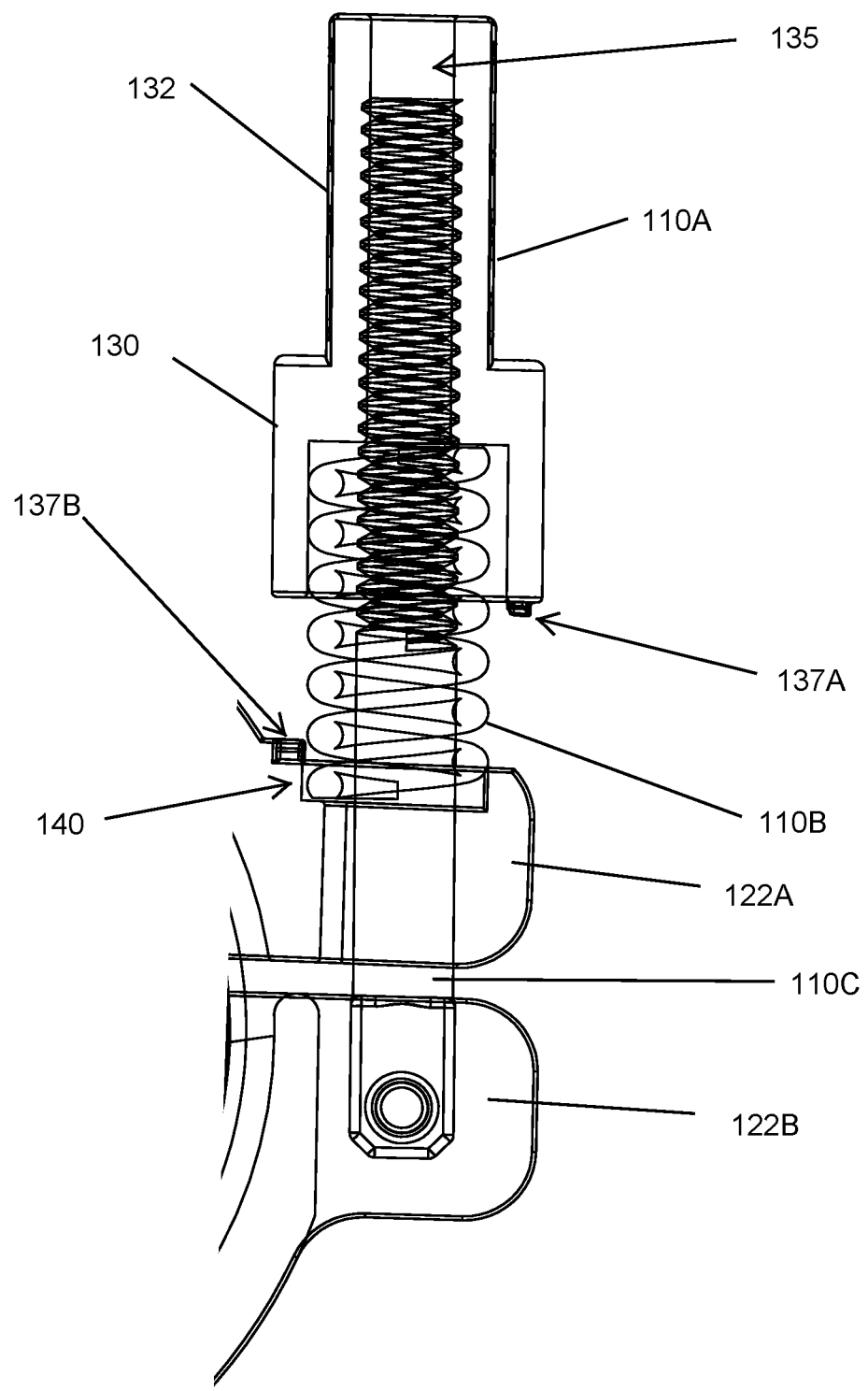
FIGS. 10A and 10B are schematic illustrations showing before and after locking the torque head to the base structure for the predetermined torque value.
Figure 10B:
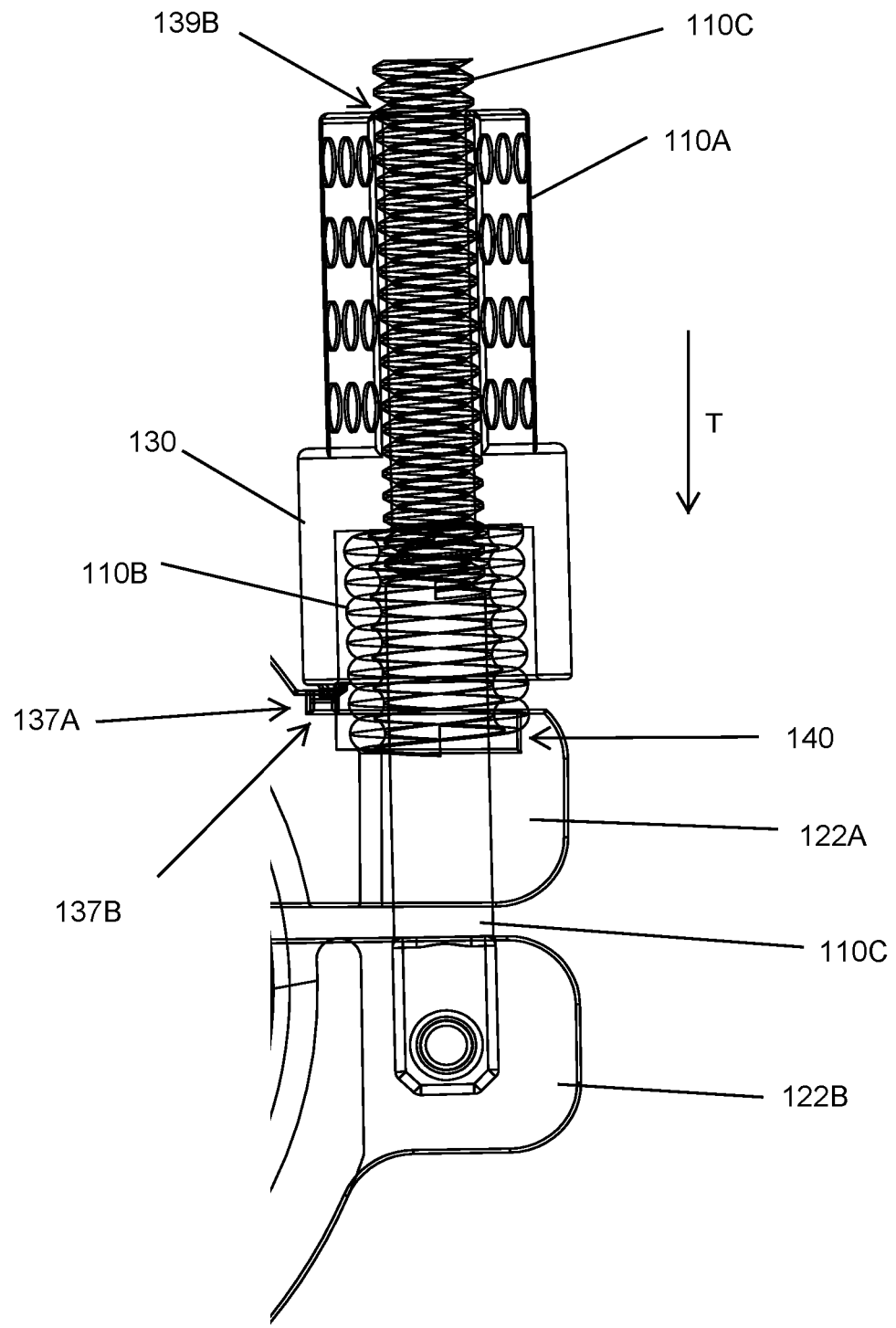

FIGS. 10A and 10B show the coupling device 110 when the tightening is initiated and when the coupling device 110 is fully tightened to exert required torque value to the combination of the flange members and the seal assembly by the clamp arms 108A and 108B to compress the seal 102A therebetween.

Referring to FIGS. 10A and 9A-9C, as the coupling device 110 is tightened, by twisting the torque head 110A around the bolt 110B, toward the base structure 140 in the direction of arrow 'T', the first protrusion 137A on the edge 136 of the spring chamber 130 may approach to the second protrusion 137B by its rotational movement without being hindered over the base surface 144A as the torque head 110A is tightened.

Referring to FIGS. 10B and 9A-9C, when the first protrusion 137A is blocked by the second protrusion 137B, the torque head 110A may not be further tightened, which indicates that the predetermined torque value or the load value for the sealing system 100 has been achieved. Further, when the predetermined torque value is reached, the torque head 110A fully engages with the base structure 140. At this stage, the spring 110B may or may not be fully compressed, but fully confined within the combined space formed by the base structure 140 and the spring chamber 130 (FIG. 9C). Stopping the further twisting of the torque head 110A by engaging the first and second protrusions 137A and 137B and the pressure exerted by the spring 110B locks the coupling device 110 at the predetermined torque value. This constraint from the base structure 140 and the locking feature prevent unintentionally untightening or loosening of the torque head 110A causing leaks at the pipe joint through the seal 102A because of the inadequate clamping pressure due to untightening and resulting energy loss at the spring. The locking feature also prevents over tightening or under-tightening of the spring 110B. Once the sealing system 100 is locked as described above, no future adjustments at the coupling assembly 110 and the tightening head 110A may be need to maintain the clamping force at the predetermined torque value.

In summary, window openings in the clamp arms of the sealing system can easily identify conditions of the inner components, i.e. color, wear, build-up, etc. Visually inspecting systematic color-coding through the windows can reduce tool downtime by advantageously identifying what kind of o-ring seal is in use without tooling tear-down. This may also help to determine the correct seal for every process and equipment when needed in short time; therefore increasing productivity. The use of the sealing system 100 with the sealing assembly 102 may be ideally suited for foundry work since the color-coding system can be customized to fit the specific operations. The sealing system 100 is designed for subfab (the area located underneath a semiconductor fabrication plant) manufacturing systems and exceptionally resilient to extreme operating temperatures. The sealing system 100 may handle aggressive gases and intensive gas flows, and deliver sealing integrity without compromise. In clean rooms, the sealing system 100 may reduces maintenance time and eliminates risk of any contamination that may create leak paths. The sealing system is reliable and has long term subfab durability.

Slender design of the sealing system 100 allows it to be easily installed in tight spaces. Mechanical wear resistance and durable joints of the system prolongs its usability. Spring provides constant fastening force and eliminates any risk of looseness caused by vibration or other working conditions. The system includes an indicator of proper torquing spec to insure tightness of the clamp for optimal sealing performance. Dual installation methods include designed torque head to tighten by hand or by a tool. The difference between the coupling member of the present invention and the prior art is that the torque head of the present invention does not include an enclosure or housing which may make it go into free-spin when the desired torque is achieved. Instead, the torque head design of the present invention includes a torque marker that will stop any tightening motion after the desired preset spring length is achieved, as described above. Parts of the coupling device are made of stainless steel for strength and highest durability. The spring in the coupling device may prevent looseness caused by vibrations. A hex-nut or thumb-screw may be alternatively used in the coupling device. The sealing system provides uniform force distribution on the seal during clamping. Visual torque marker provides requires tightness without over tightening or under tightening.

Although aspects and advantages of the present invention are described herein with respect to certain embodiments, modifications of the embodiments will be apparent to those skilled in the art. Thus, the scope of the present invention should not be limited to the foregoing discussion, but should be defined by the appended claims.

We claim:

1. A sealing system for establishing sealing between two flange members, comprising:
   a seal assembly disposed between a first flange member and a second flange member, the seal assembly including a gasket supported by an outer seal component and an inner seal component, and
   a clamp including a first clamp arm and a second clamp arm, each of the first and second clamp arms including first and second back end portions and first and second front end portions respectively, the first and second clamp arms being hingedly joined at the first and second back end portions, the first and second clamp arms being adapted to receive the flange members and the seal assembly positioned between the flange members,
      wherein each of the first clamp arm and the second clamp arm includes at least one opening enabling visual inspection of the outer seal component of the seal assembly that displays an indicator that provides information about the gasket of the seal assembly; and
   a coupling device of the clamp for drawing the front end portions of the clamp arms toward one another to tighten the clamp until a predetermine torque value being reached around the flange members to urge the flange members toward one another to compress the gasket supported by the outer seal component and the inner seal component of the seal assembly to establish sealing between the flange members at a predetermined torque.

2. The sealing system of claim 1, wherein the predetermined torque value is reached by advancing a torque head of the of the coupling device toward a base structure located on the first front end portion of the first clamp arm until a first protrusion on the torque head is blocked by a second protrusion on the base structure.

3. The sealing system of claim 2, wherein the torque head includes:
   a spring chamber with a circular front opening defined by a edge portion of the spring chamber to receive a spring, having a first end and a second end, of the coupling device, wherein the first protrusion is on the edge portion, and
   a knob portion extending from the spring chamber and including a threaded channel to threadedly engage a swivel bolt of the coupling device to advance the torque head toward the base structure by rotating the torque head.

4. The sealing system of claim 3, wherein the base structure includes a base surface and a recess formed in the base surface to receive the first end of the spring, wherein the second protrusion is formed at a predetermined location on the base surface.

5. The sealing system of claim 4, the base structure further including a base side wall extending upwardly from the base surface opposite to the recess, which is located adjacent where the first front end portion joins the first clamp arm, wherein the second protrusion joins the base side wall and supported by it at the predetermined location.

6. The sealing system of claim 5, wherein the swivel bolt being movably connected to the second front end portion of the second clamp arm so as to be movably received by the first front end portion of the first clamp arm.

7. The sealing system of claim 6, wherein the spring chamber is defined by a cylindrical side wall extending perpendicularly from a bottom wall of the spring chamber along a rotational axis of the coupling device and terminating at the edge portion of the side wall.

8. The sealing system of claim 7, wherein the second end of the spring is supported by the bottom wall of the spring chamber while the first end is placed in the recess so that as the torque head is advanced on the swivel bolt toward the base structure, the spring exerts force on the base structure resulting in drawing the first and second end portions toward one another.

9. The sealing system of claim 1, wherein the coupling device is adapted to adjust amount of torque in real time once the predetermined torque value is reached.

10. The sealing system of claim 1, wherein the indicator is an authentication indicator displayed by the outer seal component.

11. The sealing system of claim 10, wherein the authentication indicator has a specific identifying color assigned to the seal assembly to authenticate it.

12. The sealing system of claim 1, wherein the first and second clamp arms include an inner groove defined by an inner wall where the flange members and the seal assembly positioned between the flange members are received.

13. The sealing system of claim 1, wherein the at least one opening in each clamp arm extends between an outer surface and the inner wall of each clamp arm.

14. A clamp system for applying torque in real time, comprising:
   a seal assembly disposed between first and second flanges, the seal assembly including an o-ring seal supported by an outer seal support ring and an inner seal support ring;

a clamp including a first clamp arm and a second clamp arm, each of the first and second clamp arms including first and second back end portions and first and second front end portions that are outwardly projected, the first and second clamp arms being hingedly joined at the back end portions, the first and second clamp arms being adapted to receive the flange members and the seal assembly positioned between the flange members;

a base structure formed on the first front end portion, the base structure having a base surface and a base recess formed in the base surface, the base surface having a stop marker including a first protrusion at a predetermined location on the base surface;

a swivel bolt being movably connected to the second front end portion so as to be movably received by the first front end portion;

a torque head for threadingly engaging the swivel bolt to draw the first and the second clamp arms together, the torque head comprising a body having a chamber separated from a knob portion by an inner wall, the chamber extending between an opening defined by a circular edge at a first end of the body and the inner wall while the knob portion extending from the inner wall to a second end of the body; wherein a torque marker including a second protrusion is on the circular edge of the chamber; and a spring received in the chamber of the torque head so that a first end of the spring is positioned in the base recess and a second end of the spring rests against the inner wall to urge the base structure and the inner wall away from each other as the torque head is advanced toward the base structure resulting in applying force to the spring until the stop marker on the base surface blocks the torque marker of the torque head to apply the predetermined torque to clamp arms.

15. The clamp system of claim 14 further including at least one opening in each of the first clamp arm and the second clamp arm, the at least one opening enabling visual inspection of the outer seal support ring of the seal assembly that displays an indicator that provides information about the o-ring seal of the seal assembly.

16. The clamp system of claim 15, wherein the indicator is an authentication indicator displayed by the outer seal component.

17. The clamp system of claim 16, wherein the authentication indicator has a specific identifying color assigned to the seal assembly to authenticate it.

18. The clamp system of claim 14, wherein the first and second clamp arms include an inner groove defined by an inner wall where the flange members and the seal assembly positioned between the flange members are received.

19. The clamp system of claim 18, wherein the at least one opening in each clamp arm extends between an outer surface and the inner wall of each clamp arm.

20. The clamp system of claim 14, wherein the knob portion of the torque head includes a threaded bore for receiving the swivel bolt, threaded bore extending through the inner wall and the knob portion along an axis of rotation of the torque head.

21. The clamp system of claim 20, the base structure further including a base side wall extending upwardly from the base surface opposite to the recess, which is located adjacent where the first front end portion joins the first clamp arm, wherein the first protrusion joins the base side wall and supported by it at the predetermined location.

22. The clamp system of claim 14, wherein the clamp is made of stainless steel.

23. The clamp system of claim 14, wherein the o-ring seal is elastomer.

* * * * *